(12) United States Patent
Camenzind et al.

(10) Patent No.: US 7,615,522 B2
(45) Date of Patent: Nov. 10, 2009

(54) POLYMERS PRODUCED BY ATOM TRANSFER RADICAL POLYMERISATION TECHNIQUE WITH STRUCTURALLY MODIFIED TERMINAL GROUPS

(75) Inventors: Hugo Camenzind, Bern (CH); Paul Dubs, Cham (CH); Peter Hänggi, Giffers (CH); Roger Martin, Rheinfelden (CH); Andreas Mühlebach, Frick (CH); François Rime, Delémont (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 810 days.

(21) Appl. No.: 10/513,837

(22) PCT Filed: Apr. 29, 2003

(86) PCT No.: PCT/EP03/04449

§ 371 (c)(1),
(2), (4) Date: Nov. 4, 2004

(87) PCT Pub. No.: WO03/095512

PCT Pub. Date: Nov. 20, 2003

(65) Prior Publication Data

US 2005/0272617 A1    Dec. 8, 2005

(30) Foreign Application Priority Data

May 8, 2002    (EP) .................................. 02405377

(51) Int. Cl.
| | |
|---|---|
| C08F 8/00 | (2006.01) |
| C08F 293/00 | (2006.01) |
| C08K 5/00 | (2006.01) |
| C10M 145/00 | (2006.01) |

(52) U.S. Cl. ........................ 508/469; 525/129; 525/130; 525/131; 525/132; 525/133; 525/150; 525/152; 525/191; 525/192; 525/193; 525/194; 525/195; 525/196; 525/280; 525/294; 525/314; 525/326.1; 525/327.8; 525/340; 525/343; 525/360; 525/383; 508/470; 508/471

(58) Field of Classification Search ................... 44/469, 44/470, 471; 525/129–133, 150, 152, 191–196, 525/280, 294, 314, 326.1, 327.8, 340, 343, 525/360, 383

See application file for complete search history.

(56) References Cited

U.S. PATENT DOCUMENTS 6,433,100 B1 *   8/2002   Kramer et al. ........... 525/327.6

FOREIGN PATENT DOCUMENTS

| DE | 10052646 | 5/2002 |
|---|---|---|
| EP | 1000979 | 5/2000 |
| EP | 1002847 | 5/2000 |
| WO | 00/18807 | 4/2000 |
| WO | 01/40328 | 6/2001 |
| WO | 02/070575 | 9/2002 |

* cited by examiner

*Primary Examiner*—Cephia D Toomer
(74) *Attorney, Agent, or Firm*—Shiela A. Loggins

(57) ABSTRACT

The present invention relates to a block copolymer prepared by ATRP, wherein the polymer chain terminal group is structurally modified with the functionally effective group of a lubricant or polymer additive selected from the group consisting of antioxidants, metal deactivators, antiwear and extreme pressure additives and corrosion inhibitors. The invention also relates to a composition comprising the structurally modified block copolymer and a composition of matter subject to oxidative, thermal or light induced degradation, such as lubricants or polymers.

9 Claims, No Drawings

POLYMERS PRODUCED BY ATOM TRANSFER RADICAL POLYMERISATION TECHNIQUE WITH STRUCTURALLY MODIFIED TERMINAL GROUPS

The present invention relates to a block copolymer prepared by ATRP, wherein the polymer chain terminal group is structurally modified with the functionally effective group of a lubricant or polymer additive, to a composition comprising the structurally modified block-copolymer and a composition of matter subject to oxidative, thermal or light induced degradation; to a process for preparing the modified block copolymer, and to the use of the modified block co-polymer as a lubricant or polymer additive.

Lubricant or polymer additives, such as stabilisers against oxidative or thermal degradation, antiwear or extreme pressure agents or corrosion inhibitors, are added in low concentrations to improve the properties of the base materials. Particularly "metal-free" additives or additive compositions are desirable that approach the good antioxidative and anti-wear properties of the zinc dialkyldithiophosphates used so far.

It has been found advantageous to use additives with a higher molecular weight because of their lower volatility at elevated temperatures and lower extractability in contact with water or other solvents. Molecular weights in the range of 500 to 50 000, especially 1000 to 10 000, are of interest.

Various attempts have been made to increase the molecular weight of lubricant or polymer additives. U.S. Pat. No. 5,116,523 discloses sulphur adducts of poly-$\alpha$-olefins. When using polymeric mixtures of sulphides, disulphides or polysulphides lubricant compositions are prepared that are free of zinc dialkyldithiophosphates.

U.S. Pat. No. 5,274,102 discloses copolymers of olefins, $\alpha,\beta$-unsaturated dicarboxylic acids and olefinic glycidyl compounds structurally modified with glycidyl-reactive nitrogen, oxygen, phosphorus and/or sulphur compounds, for example with dialkyldithiophosphoric acid, dialkyl-phosphoric acid, dimercaptothiadiazole or carbazole. These polymeric compounds are active as antiwear agents.

U.S. Pat. No. 5,472,627 discloses co- or terpolymers grafted with olefinic carboxylic acids or acid anhydrides and imidated with aminothiadiazoles. These polymeric additives are active as viscosity improvers, antioxidants, dispersants or antiwear agents.

EP-A-673 943 discloses metal-free dithiophosphoric acid addition products of mono- or polycyclic mono- or polyunsaturated hydrocarbons and alkyl dithiophosphoric acids or alkyl/aryl dithiophosphoric acids. These phosphorus and sulphur functionalised monomeric compounds are effective as antioxidants and antiwear agents.

Many different well-established methods are available for preparing polymers, but most methods are disadvantageous. Uncontrollable recombination reactions of initiator radicals may occur subsequent to their formation with the effect that variable ratios between initiator radicals and stable free radicals are produced. Consequently, in some cases there is an inefficient control of the polymerisation process, which has the effect that polymers of a wide molecular weight range are obtained that extend far beyond the above-mentioned preferred molecular weight ranges.

Group transfer polymerisation (GTP) is a well-established method for producing A-B block copolymers of defined structures from methacrylate monomers. Despite its wide applicability and usefulness the GTP method still has several drawbacks. The polymerisation initiators used in this method, such as the silyl ketone acetals disclosed in U.S. Pat. No. 4,656,226, e.g. 1-trimethylsilyloxy-1-isobutoxy-2-methyl-propene, are difficult to prepare in a multi-step synthesis and are highly reactive. This necessitates the use of carefully dried and purified reactants, which limits this method in industrial applications operating on a large scale.

WO 96/30421 discloses a controlled or "living" polymerisation process of ethylenically unsaturated polymers, such as styrene or (meth) acrylates, by employing the Atom Transfer Radical Polymerisation (ATRP) method. This method produces defined oligomeric homopolymers and copolymers, including block copolymers. Initiators are used that generate radical atoms, such as .Cl, in the presence of a redox system of transition metals of different oxidation states, e.g. Cu(I) and Cu(II), providing "living" or controlled radical polymerisation.

A general drawback of this prior art method is seen in the fact that the polymer chains prepared by ATRP contain halogen as a terminal group that has been transferred from the polymerisation initiator.

The content of halogen is generally undesirable in polymers, since hydrogen halide may eliminate at higher temperatures, especially above 150° C. The double bond then formed is sensitive to reactions with atmospheric oxygen, which decreases the antioxidative resistance of the polymer. Moreover, hydrogen halide liberated from the polymer may also react with other functional groups present in the polymer, such as the ester groups present in acrylates. Depending on the type of the polymer, chlorine may also be released in the form of a free radical that might initiate undesirable chain reactions in the polymer structure.

WO 99/54365 discloses polymers prepared by ATRP that are dehalogenated in situ after the ATRP polymerisation step by the addition of a double bond containing compound with limited polymerisability. Subsequent hydrogen halide transfer generates a C—C-double bond at the chain end.

WO 00/18807 discloses the effective replacement of the terminal halogen in the polymers prepared by ATRP by the free radical species R'R"NO, which may have an open chain or cyclic structure.

It has surprisingly been found that lubricant or polymer additives of increased molecular weight, low volatility, low water extractability and low residual halogen are obtained by replacing the terminal halogen atoms in the polymers obtained by ATRP with the functionally effective group of a lubricant or polymer additive. Functional or multifunctional ATRP polymer additives are obtained with a residual halogen content lower than 200 or even lower than 100 ppm.

Therefore, the present invention relates to a structurally modified polymeric compound of the formula

$$X\text{-}[(A_x\text{-}B_y)\text{—}Y\text{-}Z]_m \qquad (1),$$

wherein

X represents the fragment of a polymerisation initiator capable of initiating polymerisation of ethylenically unsaturated monomers by atom transfer radical polymerisation (ATRP) in the presence of a catalyst capable of activating controlled radical polymerisation by ATRP;

A and B represent polymer blocks composed of repeating units of ethylenically unsaturated monomers;

One of x and y independently of one another represents zero, one or a numeral greater than one and the other one represents one or a numeral greater than one, provided that the sum of x and y is at least two;

Y represents the direct bond or a bivalent group;

Z represents a polymer chain terminal group structurally modified with the functionally effective group of a lubricant or polymer additive; and m represents a numeral from one to six.

The terms and definitions used in the description of the present invention preferably have the following meanings:

The formula I comprises any polymeric compound wherein the lowest total number of repeating units A and B is two. The formula I comprises polymeric compounds of low molecular weight, such as oligomers or co-oligomers, or homopolymers and copolymers of higher molecular weight, for example block, multi-block or gradient copolymers as well as copolymers characterised by a random, hyper-branched, star-shaped or dendritic arrangement of the polymer units.

The term polymerisable ethylenically unsaturated monomers applies to monomeric compounds characterised by the presence of the group >C=C< which are polymerisable by known methods, such as conventional or controlled or "living" polymerisation. Controlled or "living" polymerisation is defined as a process wherein the polymerisation is initiated from an initiating fragment which adds monomers by radical poly-addition reactions under conditions that suppress undesirable side reactions, such as radical transfer to solvent, bimolecular termination or so-called disproportionation. The suppression of these side reactions is effected to such a degree that enables the formation of a block copolymer by the subsequent addition of different monomers. The method of living polymerisation is described in U.S. Pat. No. 4,581,429.

In the structurally modified polymer of the formula (I) the group X represents the polymerisation initiator fragment of a polymerisation initiator of the formula X—Y′$_m$           (II), wherein X represents the fragment of a polymerisation initiator capable of initiating polymerisation of ethylenically unsaturated monomers by atom transfer radical polymerisation (ATRP) in the presence of a catalyst capable of activating controlled radical polymerisation by ATRP;

Y′ represents a radically transferable atom or group (.Y′); and m represents a numeral from one to six.

A suitable polymerisation initiator is capable of initiating atom transfer radical polymerisation of the fragments A and B. The polymerisation subsequently proceeds by a reaction mechanism known under the term ATRP or related methods. Suitable polymerisation initiators that contain the radically transferable atom or group .Y, are described in WO 96/30421 and WO 98/01480. A preferred radically transferable atom or group .Y′ is .Cl or .Br, which is cleaved as a radical from the initiator molecule and which may be subsequently replaced after polymerisation as a leaving group. The index m is one if one group Y′, e.g. chlorine or bromine, is present in the initiator molecule (II). A representative initiator molecule (II) wherein m is one, is a compound of the formula

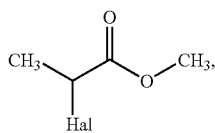

wherein Hal represents chlorine or bromine.

A representative initiator molecule, wherein m is the numeral three, is a "star-shaped" or "bird type" compound of the formula

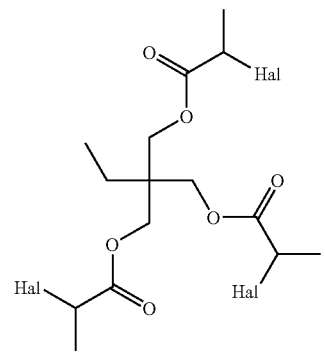

And a representative initiator molecule, wherein m is the numeral four, is a "star-shaped" compound of the formula

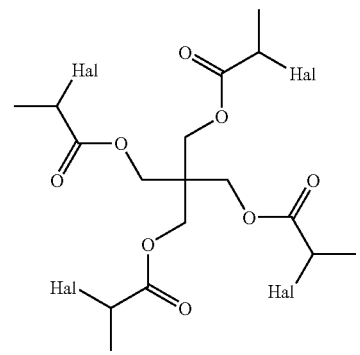

In the formulae above Hal represents chlorine or bromine. These initiator molecules are prepared by the reaction of a reactive functional derivative of α-halogen carboxylic acid of the formula

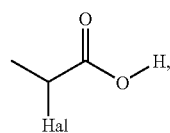

e.g. the acid chloride or bromide of this compound, with an alcohol of the formula

HO—R$_2$, wherein R$_2$ together with the HO-group represents a branched trihydroxy alcohol, e.g. 1,1,1-(tris-hydroxymethyl)propane or a branched tetrahydroxy alcohol, e.g. pentaerythritol. Initiator molecules, wherein m is the numeral five or six, are obtainable from polyhydric alcohols having five or six hydroxy groups, e.g. xylitol (m=5) or sorbitol or mannitol (m=6). The preparation of initiator molecules, wherein m represents a numeral from three to six, is described in WO 00/043344.

The use of initiators (II) wherein m represents one and one transferable group Y′ is present per initiator fragment X, generates linear polymers (I). Polymerisation initiators wherein m is greater than one, generate branched polymers (I), wherein the individual polymer "branches" are linked together at the initiator fragment X. Preferred branched polymers (I) are obtainable from the "star-shaped" initiators of the formulae above.

A preferred polymerisation initiator (II), which generates linear polymers or block copolymers, wherein m represents one, is selected from the group consisting of $C_1$-$C_8$alkyl halides, $C_6$-$C_{15}$aralkylhalides, $C_2$-$C_8$haloalkyl esters, arene sulphonyl chlorides, α-haloalkane nitriles, α-haloacrylates and halolactones.

Specific initiators (II) are selected from the group consisting of α,α'-dichloro- or α,α'-dibromoxylene, p-toluene-sulphonylchloride (PTS), hexakis-(α-chloro- or α-bromom-ethyl)-benzene, 1-phenethyl chloride or bromide, methyl or ethyl 2-chloro- or 2-bromopropionate, methyl or ethyl-2-bromo- or 2-chlorooisobutyrate, and the corresponding 2-chloro- or 2-bromopropionic acid, 2-chloro- or 2-bromoisobutyric acid, chloro- or bromoacetonitrile, 2-chloro- or 2-bromopropionitrile, α-bromobenzacetonitrile, α-bromo-γ-butyrolactone (=2-bromo-dihydro-2 (3H)-furanone) and the initiators derived from 1,1,1-(tris-hydroxymethyl)propane and pentaerythritol of the formulae of above.

In the polymeric compound (I) the polymer blocks A and B are composed of repeating units of ethylenically unsaturated monomers suitable for the method of controlled or living polymerisation. In an alternative embodiment the polymer blocks A or B or A and B are additionally composed of repeating units of ethylenically unsaturated comonomers substituted with basic or acidic groups.

Representative ethylenically unsaturated monomers present as repeating units in the polymer blocks A and B are selected from the group consisting of styrenes, acrylic and $C_1$-$C_4$alkylacrylic acid-$C_1$-$C_{24}$alkyl esters, acrylic and $C_1$-$C_4$alkylacrylic acid-$C_8$-$C_{11}$aryl-$C_1$-$C_4$alkyl esters, acrylic and $C_1$-$C_4$alkylacrylic acid-$C_8$-$C_{11}$aryloxy-$C_1$-$C_4$alkyl esters, acrylic and $C_1$-$C_4$alkylacrylic acid-hydroxy-$C_2$-$C_6$alkyl esters, acrylic and $C_1$-$C_4$alkylacrylic acid-polyhydroxy-$C_3$-$C_6$alkyl esters, acrylic and $C_1$-$C_4$alkylacrylic acid-($C_1$-$C_4$alkyl)$_3$silyloxy-$C_2$-$C_4$alkyl esters, acrylic and $C_1$-$C_4$alkylacrylic acid-($C_1$-$C_4$alkyl)$_3$silyl-$C_1$-$C_4$alkyl esters, acrylic and $C_1$-$C_4$alkyl-acrylic acid-heterocyclyl-$C_2$-$C_4$alkyl esters, acrylic and $C_1$-$C_4$alkylacrylic acid esters having poly-$C_2$-$C_4$alkyleneglycol ester groups, wherein the ester groups may be, substituted with $C_1$-$C_{24}$alkoxy groups, acrylic and methacrylic acid amides, acrylic and $C_1$-$C_4$alkylacrylic acid-($C_1$-$C_4$alkyl)$_{1-2}$amide, acrylonitrile, esters of maleic acid or fumaric acid, maleinimide and N-substituted maleinimides.

In a preferred embodiment one of the polymer blocks A and B is essentially composed of repeating units of ethylenically unsaturated monomers selected from the group consisting of styrenes, acrylic and methacrylic acid-$C_1$-$C_{24}$alkyl esters, acrylic and methacrylic acid-hydroxy-$C_2$-$C_6$alkyl esters, acrylic and methacrylic acid-dihydroxy-$C_3$-$C_4$alkyl esters and acrylic and methacrylic acid esters having poly-$C_2$-$C_4$alkyleneglycol ester groups, wherein the ester groups may be substituted with $C_1$-$C_{24}$alkoxy groups.

Suitable styrenes may be substituted at the phenyl group by one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl.

Suitable acrylic acid or methacrylic acid-$C_1$-$C_{24}$alkyl esters are acrylic acid or methacrylic acid esters esterified by methyl, ethyl, n-butyl, isobutyl, tert-butyl, neopentyl, 2-ethylhexyl, isobornyl, isodecyl, n-dodecyl, n-tetradecyl, n-hexadecyl or n-octadecyl.

Representative acrylic and $C_1$-$C_4$alkylacrylic acid-$C_6$-$C_{11}$aryl-$C_1$-$C_4$alkyl esters are acrylic acid or methacrylic acid esters esterified by benzyl, 2-phenylethyl, 1- or 2-naphthyl-methyl or 2-(1- or 2-naphthyl)-ethyl. The phenyl or naphthyl groups may be additionally substituted with one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl or methyl.

Representative acrylic and $C_1$-$C_4$alkylacrylic acid-$C_6$-$C_{11}$aryloxy-$C_1$-$C_4$alkyl esters are acrylic acid or methacrylic acid esters esterified by 2-phenoxyethyl or 2-benzyloxyethyl.

Representative acrylic acid and $C_1$-$C_4$alkylacrylic acid-hydroxy-$C_2$-$C_4$alkyl esters are acrylic acid- or methacrylic acid-2-hydroxyethyl esters (HEA, HEMA) or acrylic acid- or methacrylic acid-2-hydroxypropyl ester (HPA, HPMA).

Representative acrylic and $C_1$-$C_4$alkylacrylic acid-polyhydroxy-$C_3$-$C_6$alkyl esters are acrylic acid- or methacrylic acid esterified by ethylene glycol or glycerol.

Representative acrylic acid- and $C_1$-$C_4$alkylacrylic acid-silyloxy-$C_2$-$C_4$alkyl esters are acrylic acid- or methacrylic acid-2-trimethylsilyloxyethyl esters (TMS-HEA, TMS-HEMA).

Representative acrylic acid- or $C_1$-$C_4$alkylacrylic acid-($C_1$-$C_4$alkyl)$_3$silyl-$C_2$-$C_4$alkyl esters are acrylic acid- or methacrylic acid-2-trimethylsilylethyl esters or acrylic acid- or methacrylic acid-3-trimethylsilyl-n-propyl esters.

Representative acrylic and $C_1$-$C_4$alkylacrylic acid esters having poly-$C_2$-$C_4$alkyleneglycol ester groups, wherein the ester groups may be substituted with $C_1$-$C_{24}$alkoxy groups are illustrated by the formula given below:

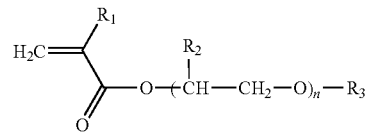

wherein
n represents a numeral from one to 100;
$R_1$ and $R_2$ independently of one another represent hydrogen or methyl; and
$R_3$ represents $C_1$-$O_{24}$alkyl, e.g. methyl, ethyl, n- or isopropyl, n-, iso-, or tert-butyl, n- or neo-pentyl, n-dodecyl, n-tetradecyl, n-hexadecyl, n-octadecyl, or represents aryl-$C_1$-$C_{24}$alkyl, e.g. benzyl or phenyl-n-nonyl, as well as $C_1$-$C_{24}$alkylaryl or $C_1$-$C_{24}$alkylaryl-$C_1$-$C_{24}$alkyl.

Representative acrylic acid- and $C_1$-$C_4$alkylacrylic acid-heterocyclyl-$C_2$-$C_4$alkyl esters are acrylic acid- or methacrylic acid-2-(N-morpholinyl, 2-pyridyl, 1-imidazolyl, 2-oxo-1-pyrrolidinyl, 4-methylpiperidin-1-yl or 2-oxoimidazolidin-1-yl)-ethyl esters.

Representative $C_1$-$C_4$alkylacrylic acid esters having poly-$C_2$-$C_4$alkyleneglycol ester groups wherein the ester groups may be substituted with $C_1$-$C_{24}$alkoxy groups, are acrylic acid- or methacrylic acid esters of ethoxylated decanol or ethoxylated lauryl or stearyl alcohol, wherein the degree of ethoxylation, as expressed by the index n in the formula above, is typically in the range from 5 to 30.

Representative acrylic and $C_1$-$C_4$alkylacrylic acid-($C_1$-$C_4$alkyl)$_{1-2}$amide are acrylic acid- or methacrylic acid N-methyl, N,N-dimethyl, N-ethyl or N,N-diethyl amide.

Representative esters of maleic acid or fumaric acid are the $C_1$-$C_{24}$alkyl esters, e.g. the methyl, ethyl, n-butyl, isobutyl, tert-butyl, neopentyl, 2-ethylhexyl, isobornyl, isodecyl, n-dodecyl, n-tetradecyl, n-hexadecyl or n-octadecyl esters, the $C_6$-$C_{11}$aryl esters, e.g. phenyl or naphthyl esters, or the $C_6$-$C_{11}$aryl-$C_1$-$C_4$alkyl esters, e.g. benzyl or 2-phenethyl esters. The phenyl or naphthyl groups may be additionally substituted with one to three additional substituents selected from the group consisting of hydroxy, $C_1$-$C_4$alkoxy, e.g. methoxy or ethoxy, halogen, e.g. chloro, and $C_1$-$C_4$alkyl, e.g. methyl.

Representative N-substituted maleinimides are the N—$C_1$-$C_4$alkyl, e.g. N-methyl or N-ethyl, or N-aryl, e.g. N-phenyl substituted maleinimides.

In an alternative embodiment the polymer blocks A or B or A and B contain repeating units of ethylenically unsaturated monomers substituted with basic groups; Suitable ethylenically unsaturated monomers substituted with a basic group are represented by compounds of the formula

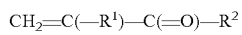

wherein $R^1$ represents hydrogen or $C_1$-$C_4$alkyl; and $R^2$ represents a basic substituent selected from the group consisting of amino-$C_2$-$C_{18}$alkoxy, $C_1$-$C_4$alkylamino-$C_2$-$C_{18}$alkoxy, di-$C_1$-$C_4$alkylamino-$C_2$-$C_{18}$alkoxy, hydroxy-$C_2$-$C_4$alkylamino-$C_2$-$C_{18}$alkoxy and $C_1$-$C_4$alkyl-(hydroxy-$C_2$-$C_4$alkyl)amino-$C_2$-$C_{18}$alkoxy.

Another ethylenically unsaturated monomer substituted with a basic group is an amino monomer selected from the group consisting of amino substituted styrene, ($C_1$-$C_4$alkyl)$_{1-2}$amino substituted styrene, N-mono-($C_1$-$C_4$alkyl)$_{1-2}$amino-$C_2$-$C_4$alkyl(meth)acryl amide and N,N-di-($C_1$-$C_4$alkyl)$_{1-2}$amino-$C_2$-$C_4$alkyl(meth)acryl amide, vinyl pyridine or $C_1$-$C_4$alkyl substituted vinyl pyridine, vinyl imidazole and $C_1$-$C_4$alkyl substituted vinyl imidazole.

Representative amino substituted styrenes or ($C_1$-$C_4$alkyl)$_{1-2}$amino substituted styrenes are substituted at the phenyl group with one or two amino groups or one or two ($C_1$-$C_4$alkyl)$_{1-2}$amino groups, particularly one amino group in 4-position. Additional substituents are selected from the group consisting of hydroxy, $C_1$-$C_4$alkoxy, e.g. methoxy or ethoxy, halogen, e.g. chloro, or $C_1$-$C_4$alkyl, e.g. methyl or ethyl.

Representative N-mono-($C_1$-$C_4$alkyl)$_{1-2}$amino-$C_2$-$C_4$alkyl(meth)acryl amide and N,N-di-($C_1$-$C_4$alkyl)$_{1-2}$amino-$C_2$-$C_4$alkyl(meth)acryl amide are 2-N-tert-butylamino- or 2-N,N-dimethyl-aminoethylacrylamide or 2-N-tert-butylamino- or 2-N,N-dimethylaminopropylmethacrylamide.

In a preferred embodiment of the invention the repeating unit of an ethylenically unsaturated monomer substituted with a basic group present in the polymer blocks A or B or A and B is represented by a compound of the formula (III), wherein $R^1$ represents hydrogen or methyl; and $R^2$ represents amino substituted $C_2$-$C_{18}$alkoxy selected from the group consisting of amino-$C_2$-$C_4$alkoxy, $C_1$-$C_4$alkylamino-$C_2$-$C_4$alkoxy, di-$C_1$-$C_4$alkylamino-$C_2$-$C_4$alkoxy, hydroxy-$C_2$-$C_4$alkylamino-$C_2$-$C_{18}$alkoxy and $C_1$-$C_4$alkyl-(hydroxy-$C_2$-$C_4$alkyl)amino-$C_2$-$C_4$alkoxy;

or is amino substituted styrene, ($C_1$-$C_4$alkyl)$_{1-2}$amino substituted styrene and N,N-di-($C_1$-$C_4$alkyl)$_2$amino-$C_2$-$C_4$alkyl (meth)acryl amide.

In a preferred embodiment of the invention the ethylenically unsaturated monomer substituted with a basic group present in one of the polymer blocks A or B or A and B is represented by an 2-ammoniumethyl ester group of the formula

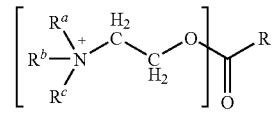

wherein $R^a$, $R^b$ and $R^c$ independently of one another represent hydrogen or a substituent selected from the group consisting of $C_1$-$C_4$alkyl, aryl-$C_1$-$C_4$alkyl and ($C_1$-$C_4$alkyl)$_{1-3}$aryl.

Preferred examples of repeating units of ethylenically unsaturated monomers substituted with a basic group are represented by amino monomers selected from the group consisting of 4-aminostyrene, 4-dimethylaminostyrene and an aminoalkyl (meth)acrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-tert-butylaminoethyl acrylate (t-BAEA), 2-tert-butylaminoethyl methacrylate (t-BAEMA) and 3-dimethylaminopropylmethacrylamide, 4-vinylpyridine, 2-vinylpyridine and 1-vinylimidazole.

According to another alternative embodiment the polymer blocks A or B or A and B contain repeating units of ethylenically unsaturated monomers substituted with acidic groups. A suitable ethylenically unsaturated monomer substituted with an acidic group present in one of the polymer blocks A or B or A and B is represented by a compound of the formula (III), wherein $R^1$ represents hydrogen or $C_1$-$C_4$alkyl; and $R^2$ represents $C_1$-$C_4$alkyl substituted by carboxy, sulpho or phosphono.

In the polymeric compound (I) the index numbers x and y Independently of one another define the number of monomer units present in the polymer blocks A and B. One of x and y represents zero, one or a numeral greater than one and the other one represents one or a numeral greater than one, provided that the sum of x and y is at least two. A range from two to 1 000 is preferred for the sum of x and y. The preferred molecular weight range of both polymer blocks A and B is from about 1 000 to 100 000, preferably about 1 000 to 50 000. A particularly preferred molecular weight range is from about 1 000 to 15 000.

In the polymeric compound (I) Y represents the direct bond or a bivalent group that links the group Z with either one of the polymer blocks A or B. In a preferred embodiment of the invention the bivalent group Y represents $C_1$-$C_{25}$Alkylene, —O— or p-phenylene or $C_5$-$C_8$cycloalkylene; or —($C_1$-$C_{25}$Alkylene)O—, —[$C_1$-$C_{25}$alkylene-(C(=O)—O)]—, or —($C_1$-$C_{25}$alkylene)S—; or $C_2$-$C_{25}$Alkylene that is interrupted by at least one heteroatom, a bivalent functional group or substituted bivalent functional group selected from the group consisting of —O—, —S—, —C(=O)—, —C(=S)—, —S(=O)—, —S(=O)$_2$—, —S(=O)$_2$—NH—, —NH—, —N$^+$H$_2$—, —C(=O)—O—, —C(=S)—S—, —NH—C(=O)—, —NH—C(=S)—, —O—C(=O)—O—, —NH—C(=O)—O—, —NH—C(=O)—O—, —NH—C(=S)—S—, —N($C_1$-$C_4$alkyl)-, —N$^+$H($C_1$-$C_4$alkyl)-, —N$^+$($C_1$-$C_4$alkyl)$_2$—, —C(=O)—N($C_1$-$C_4$alkyl)-, —C(=S)—N($C_1$-$C_4$alkyl)-, —S—C(=S)—N($C_1$-$C_4$alkyl)- and —O—C(=O)—N($C_1$-$C_4$alkyl)-; or represents A bivalent functional group or substituted functional group selected from the group consisting of —O—, —S—, —C(=O)—, —C(=S)—, —S(=O)—, —S(=O)$_2$—, —S(=O)$_2$—NH—, —NH—, —N$^+$H$_2$—, —C(=O)—O—, —C(=S)—S—, —NH—C(=O)—, —NH—C(=S)—, —O—C(=O)—O—, —NH—C(=O)—O—, —NH—C(=S)—O—, —NH—C(=S)—S—, —N(C$_1$-C$_4$alkyl)-, —N$^+$H(C$_1$-C$_4$alkyl)-, —N$^+$(C$_1$-C$_4$alkyl)$_2$—, —C(=O)—N(C$_1$-C$_4$alkyl), —C(=S)—N(C$_1$-C$_4$alkyl)-, —S—C(=S)—N(C$_1$-C$_4$alkyl)- and —O—C(=O)—N(C$_1$-C$_4$alkyl)-.

The term C$_1$-C$_{25}$alkylene comprises within the limits of the given definition methylene, 1,1- or 1,2-ethylene, 1,2- or 1,3-propylene or straight chain α,ω-C$_4$-C$_{25}$alkylene.

The term C$_5$-C$_8$cycloalkylene comprises within the limits of the given definition 1,1-1,2- or 1,3-cyclopentylene or 1,1-1,2- or 1,4-cyclohexylene.

The groups —(C$_1$-C$_{25}$alkylene)O—, —(C$_1$-C$_{25}$alkylene)S— or comprise within the given definitions the embodiments —O—C$_1$-C$_{25}$alkylene-, —C$_1$-C$_{25}$alkylene-O—, —S—C$_1$-C$_{25}$alkylene-, —C$_1$-C$_{25}$alkylene-S—, wherein the oxygen and sulphur heteroatoms are in adjacent positions either to the group -(A$_x$-B$_y$)- or the terminal group -Z.

The group —[C$_1$-C$_{25}$alkylene-(C(=O)—O)]— comprises within the given definitions the embodiments —(C=O)—C$_1$-C$_{25}$alkylene-, —C$_1$-C$_{25}$alkylene-O—(C=O)—, —(C=O)—O—C$_1$-C$_{25}$alkylene- or —C$_1$-C$_{25}$alkylene-(C=O)—O—.

The bivalent functional groups —S(=O)$_2$—NH—, —C(=O)—O—, —C(=S)—S—, —NH—(C=O)—, —NH—C(=S)—, —NH—C(=O)—O—, —NH—C(=S)—O—, —NH—C(=S)—S— comprise within the given definitions the isomeric embodiments —NH—S(=O)$_2$—, —O—C(=O)—, —S—C(=S)—, —(C=O)—NH—, —C(=S)—NH—, —O—C(=O)—NH—, —O—C(=S)—NH— and —S—C(=S)—NH—, wherein the oxygen, sulphur and nitrogen atoms are located in different positions with regard to the group -(A$_x$-B$_y$)- and the terminal group -Z.

The bivalent substituted functional groups —C(=O)—N(C$_1$-C$_4$alkyl)-, —C(=S)—N(C$_1$-C$_4$alkyl)-, —S—C(=S)—N(C$_1$-C$_4$alkyl)- and —O—C(=O)—N(C$_1$-C$_4$alkyl)- comprise within the given definitions the isomeric embodiments —N(C$_1$-C$_4$alkyl)-C(=O)—, —N(C$_1$-C$_4$alkyl)-(C=S)—, —N(C$_1$-C$_4$alkyl)-C(=S)—S— and —N(C$_1$-C$_4$alkyl)-C(=O)—O—, wherein the substituted nitrogen atoms are located in different positions with regard to the group -(A$_x$-B$_y$)- and the terminal group -Z.

In a preferred embodiment of the invention the bivalent group Y represents

C$_1$-C$_{25}$Alkylene; —(C$_1$-C$_{25}$alkylene)O—, —[C$_1$-C$_{25}$alkylene-(C(=O)—O)]— or —(C$_1$-C$_{25}$alkylene)S—; or C$_2$-C$_{25}$Alkylene that is interrupted by at least one heteroatom or a bivalent functional group selected from the group consisting of —O—, —S—, —C(=O)—, —C(=S)—, —S(=O)—, —S(=O)$_2$—, —S(=O)$_2$—NH—, —NH—, —N$^+$H$_2$—, —C(=O)—O—, —C(=S)—S—, —NH—C(=O)—, —NH—C(=S)—, —O—C(=O)—O—, —NH—C(=O)—O—, —NH—C(=S)—O— and —NH—C(=S)—S—; or represents A bivalent functional group selected from the group consisting of —O—, —S—, —C(=O)—, —C(=S)—, —S(=O)—, —S(=O)$_2$—, —S(=O)$_2$—NH—, —NH—, —N$^+$H$_2$—, —C(=O)—O—, —C(=S)—S—, —NH—C(=O)—, —NH—C(=S)—, —O—C(=O)—O—, —NH—C(=O)—O—, —NH—C(=S)—O—, —NH—C(=S)—S—, —N(C$_1$-C$_4$alkyl)-, —N$^+$H(C$_1$-C$_4$alkyl)-, —N$^+$(C$_1$-C$_4$alkyl)$_2$—, —C(=O)—N(C$_1$-C$_4$alkyl)-, —C(=S)—N(C$_1$-C$_4$alkyl)-, —S—C(=S)—N(C$_1$-C$_4$alkyl)- and —O—C(=O)—N(C$_1$-C$_4$alkyl)-.

In the polymeric compound (I) Z represents a polymer chain terminal group structurally modified with the functionally effective group of a lubricant or polymer additive.

Suitable lubricant or polymer additives are selected from the group consisting of antioxidants, metal deactivators, anti-wear and extreme pressure additives and corrosion inhibitors.

In a preferred embodiment of the invention the polymer chain terminal group Z is derived from an antioxidant molecule selected from the group consisting of alkylated monophenols, alkylthiomethyl phenols, alkylidene bisphenols, esters of β-(5-tert-butyl-4-hydroxy-3-methylphenyl)-propionic acid, β-(3,5-di-tert-butyl-4-hydroxyphenyl)propionic acid, β-(3,5-dicyclohexyl-4-hydroxyphenyl)propionic acid or 3,5-di-tert-butyl-4-hydroxyphenylacetic acid, diphenylamines, benzofuranones, phosphites, phosphonites and thiosynergists.

Representative examples of a polymer chain terminal group Z derived from an antioxidant molecule selected from the group of alkylated monophenols and alkylthiomethyl phenols are illustrated by the partial formula:

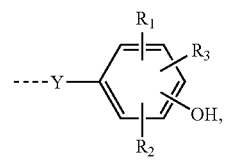

(A)

wherein

R$_1$ represents a substituent selected from the group consisting of C$_1$-C$_{12}$alkyl, C$_2$-C$_{12}$—S—C$_1$-C$_4$alkyl, C$_5$-C$_8$cycloalkyl, C$_6$-C$_{10}$aryl and C$_7$-C$_{12}$aralkyl;

R$_2$ and R$_3$ independently of one another represent hydrogen or substituents selected from the group consisting of C$_1$-C$_{12}$alkyl, C$_2$-C$_{12}$—S—C$_1$-C$_4$alkyl, C$_5$-C$_8$cycloalkyl, C$_6$-C$_{10}$aryl and C$_7$-C$_{12}$aralkyl; and The bivalent bridge group Y is as defined above.

In a particularly preferred embodiment of the invention the polymer chain terminal group Z is represented by the partial formula A, wherein R$_1$ represents C$_1$-C$_4$alkyl or C$_6$-C$_{12}$alkylthiomethyl;

R$_2$ represents hydrogen, C$_1$-C$_4$alkyl or C$_6$-C$_{12}$alkylthiomethyl;

R$_3$ represents hydrogen; and

The bivalent bridge group Y is as defined above.

In a particularly preferred embodiment of the invention the polymer chain terminal group Z derived from an antioxidant molecule is illustrated by the partial formula of alkylated monophenols:

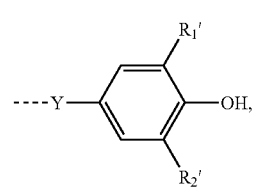

(A')

wherein

R$_1$ represents C$_3$-C$_4$alkyl;

R$_2$ represents hydrogen or C$_1$-C$_4$alkyl; and

The bivalent bridge group Y is as defined above.

Representative examples of a polymer chain terminal group Z derived from an antioxidant molecule from the group of alkylidene bisphenols are illustrated by the partial formula:

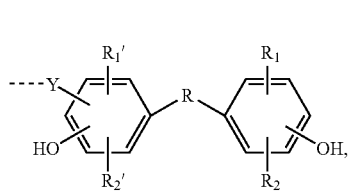
(B)

wherein independently of one another
R represents $C_1$-$C_4$alkylene;
$R_1$ and $R_1'$ represent substituents selected from the group consisting of $C_1$-$C_{12}$alkyl, $C_5$-$C_8$cycloalkyl, $C_6$-$C_{10}$aryl and $C_7$-$C_{12}$aralkyl;
$R_2$ and $R_2'$ represent hydrogen or substituents selected from the group consisting of $C_1$-$C_{12}$alkyl, $C_5$-$C_8$cycloalkyl, $C_6$-$C_{10}$aryl and $C_7$-$C_{12}$aralkyl;
R represents $C_1$-$C_4$alkylene; and
The bivalent bridge group Y is as defined above.

Representative examples of a polymer chain terminal group Z derived from an antioxidant molecule selected from the group of esters of β-(5-tert-butyl-4-hydroxy-3-methylphenyl)-propionic acid, β-(3,5-di-tert-butyl-4-hydroxyphenyl)-propionic acid, β-(3,5-dicyclohexyl-4-hydroxyphenyl) propionic acid and 3,5-di-tert-butyl-4-hydroxyphenylacetic acid are illustrated by the partial formula:

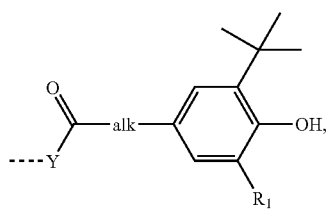
(C)

wherein
$R_1$ represents methyl or tert-butyl;
alk represents methylene, 1,2-ethylene or thiodimethylene; and
Y represents —O—.

Representative examples of a polymer chain terminal group Z derived from an antioxidant molecule selected from the group of aminic antioxidants are illustrated by the partial formula:

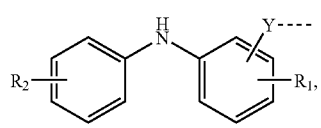
(D)

wherein
$R_1$ and $R_2$ independently of one another represent hydrogen, $C_1$-$C_{18}$alkyl, $C_7$-$C_9$phenylalkyl or phenyl; and
The bivalent bridge group Y is as defined above.

Representative examples of a polymer chain terminal group Z derived from an antioxidant molecule selected from the group of benzofuranones are illustrated by the partial formula

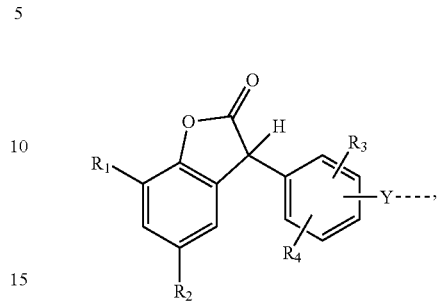
(E)

wherein
$R_1$ and $R_2$ independently of one another represent hydrogen, $C_1$-$C_{18}$alkyl, $C_7$-$C_9$phenylalkyl, phenyl or $C_5$-$C_8$cycloalkyl,
$R_3$ and $R_4$ are each independently of the other hydrogen, halogen, $C_1$-$C_4$alkyl, —CN, trifluoromethyl or $C_1$-$C_4$alkoxy,
Y is as defined above.

Representative examples of a polymer chain terminal group Z derived from an antioxidant molecule selected from the group of phosphites and phosphonites are illustrated by the partial formula

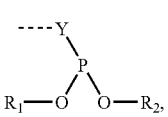
(F)

wherein
$R_1$ and $R_2$ independently of one another represent $C_1$-$C_{18}$alkyl, $C_7$-$C_9$phenylalkyl, cyclohexyl, phenyl or phenyl substituted by one to three $C_1$-$C_6$alkyl groups; and
Y represents —O— or the direct bond.

Representative examples of a polymer chain terminal group Z derived from an antioxidant molecule selected from the group of thiosynergists are illustrated by the partial formula

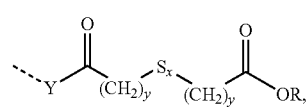
(G)

wherein
R represents $C_1$-$C_{18}$alkyl;
x is a numeral from one to three;
y is a numeral from one to three; and
Y represents —O—.

In another preferred embodiment of the invention the polymer chain terminal group Z is derived from a metal deactivator molecule selected from the group consisting of benzotriazoles, triazoles, benzimidazoles, imidazoles, benzothiazoles and thiadiazoles and derivatives thereof.

Representative examples of a polymer chain terminal group Z derived from a metal deactivator molecule selected from the group of benzotriazoles and derivatives thereof are illustrated by the partial formula

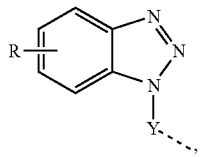
(H)

wherein
R represents $C_1$-$C_9$alkyl; and
Y represents the direct bond.

Representative examples of a polymer chain terminal group Z derived from a metal deactivator molecule selected from the group of 1,2,4-triazoles and derivatives thereof are illustrated by the partial formula

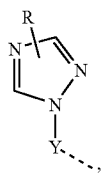
(I)

wherein
R represents $C_1$-$C_9$alkyl; and
Y represents the direct bond.

Representative examples of a polymer chain terminal group Z derived from a metal deactivator molecule selected from the group of benzimidazoles and derivatives thereof are illustrated by the partial formula

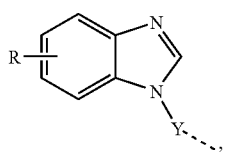
(K)

wherein
R represents $C_1$-$C_9$alkyl; and
Y represents the direct bond.

Representative examples of a polymer chain terminal group Z derived from a metal deactivator molecule selected from the group of imidazoles and derivatives thereof are illustrated by the partial formula

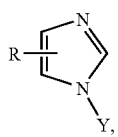
(L)

wherein
R represents $C_1$-$C_9$alkyl; and
Y represents the direct bond.

Representative examples of a polymer chain terminal group Z derived from a metal deactivator molecule selected from the group of benzothiazoles and derivatives thereof are illustrated by the partial formula

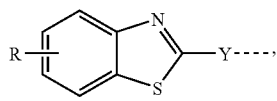
(M)

wherein
R represents $C_1$-$C_4$alkyl; and
Y represents —S— or the direct bond.

Representative examples of a polymer chain terminal group Z derived from a metal deactivator molecule selected from the group of thiadiazoles and derivatives thereof are illustrated by the partial formula:

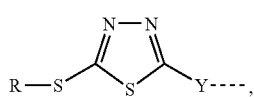
(N)

wherein
R represents $C_1$-$C_{18}$alkyl; $C_{7-9}$phenylalkyl, $C_1$-$C_{18}$alkyl-O—(C=O)—(CH$_2$)$_x$—, $C_4$-$C_{18}$alkyl-S— or $C_1$-$C_{18}$alkyl-O—(C=O)—(CH$_2$)$_x$—S—; and
Y represents —S—.

In another preferred embodiment of the invention the polymer chain terminal group Z is derived from an antioxidant, extreme pressure or antiwear (EP/AW) molecule selected from the group consisting of phosphates, thiophosphates, thiophosphites, dithiophosphates, phosphonates, thiophosphonates, dithiocarbamates and esters of thiodipropionic or thiodiacetic acid.

Representative examples of a polymer chain terminal group Z derived from phosphates, thiophosphates, phosphites, thiophosphites, dithiophosphates, phosphonates and thiophosphonates are represented by the following partial formula:

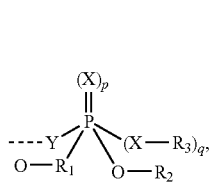
(O)

wherein
p and q independently of one another represents zero or one;
X represents oxygen or sulphur;
$R_1$, $R_2$ and $R_3$ independently of one another represents $C_3$-$C_6$alkyl, $C_5$-$C_6$cycloalkyl, phenyl or $(C_1$-$C_4$alkyl$)_{1-3}$phenyl; and
Y represents the direct bond, $C_1$-$C_4$alkylene, —O— or —S—.

Representative examples of a polymer chain terminal group Z derived from dithiocarbamates are represented by the following partial formula:

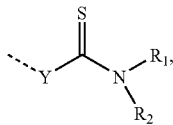
(P)

wherein $R_1$ and $R_2$ represent $C_1$-$C_{18}$ alkyl; and

Y represents —S—;

Representative examples of a polymer chain terminal group Z derived from esters of thiodipropionic or thiodiacetic acid are represented by the partial formula (G) and the definitions given above.

In another preferred embodiment of the invention the polymer chain terminal group Z is derived from a corrosion inhibitor molecule corresponding to the following partial formula:

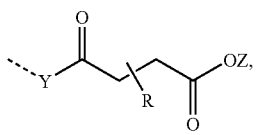
(Q)

wherein

R represents H or methyl;

Z represents H, an alkaline or an alkali metal cation, or the ammonium, $(C_1$-$C_4$alkyl$)_{1-4}$ammonium or the ethanol$(C_1$-$C_4$alkyl$)_3$ammonium ions; and Y represents —O—.

A preferred embodiment of the invention relates to a polymeric compound (1), wherein X represents the fragment of a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, haloalkanenitriles, α-haloacrylates and halolactones;

A and B represent polymer blocks composed of repeating units of acrylic acid or methacrylic acid esters selected from the group consisting of styrenes, acrylic and $C_1$-$C_4$alkylacrylic acid-$C_1$-$C_{24}$alkyl esters, acrylic and $C_1$-$C_4$alkylacrylic acid-$C_6$-$C_{11}$aryl-$C_1$-$C_4$alkyl esters, acrylic and $C_1$-$C_4$alkylacrylic acid-$C_6$-$C_{11}$aryloxy-$C_1$-$C_4$alkyl esters, acrylic and $C_1$-$C_4$alkylacrylic acid-hydroxy-$C_2$-$C_6$alkyl esters, acrylic and $C_1$-$C_4$alkylacrylic acid-polyhydroxy-$C_3$-$C_6$alkyl esters, acrylic and $C_1$-$C_4$alkylacrylic acid-$(C_1$-$C_4$alkyl$)_3$silyloxy-$C_2$-$C_4$alkyl esters, acrylic and $C_1$-$C_4$alkylacrylic acid-$(C_1$-$C_4$alkyl$)_3$silyl-$C_1$-$C_4$alkyl esters, acrylic and $C_1$-$C_4$alkylacrylic acid-heterocyclyl-$C_2$-$C_4$alkyl esters, acrylic and $C_1$-$C_4$alkylacrylic acid esters having poly-$C_2$-$C_4$alkyleneglycol ester groups, wherein the ester groups may be substituted with $C_1$-$C_{24}$alkoxy groups, acrylic and methacrylic acid amides, acrylic and $C_1$-$C_4$alkylacrylic acid-$(C_1$-$C_4$alkyl$)_{1-2}$amide, acrylonitrile, esters of maleic acid or fumaric acid, maleinimide and N-substituted maleinimides x and y represent numerals greater than zero and define the number of monomer units in the polymer blocks A and B;

Y represents a bivalent bridge group; and

Z represents a polymer chain terminal group structurally modified with the functionally effective group of a lubricant or polymer additive selected from the group consisting of antioxidants, metal deactivators, antiwear and extreme pressure additives and corrosion inhibitors.

The polymeric compounds (I) according to the present invention are particularly suitable as additives for any organic composition of matter that is subject to oxidative, thermal or light-induced degradation, e.g. oils, greases, fuels or polymers.

The polymeric compounds (I) are characterised by their low volatility and good solubility in oil grease or non-polar polymers. They have potential for an improved frictional coefficient or improve dispersion capacity in oils. The polymeric compounds (I) are effective as antioxidants, metal passivators, extreme pressure and/or antiwear agents or as corrosion inhibitors. They may also be multifunctional in combining two or more of these activities, e.g. as anti-oxidant and extreme pressure agent, as antiwear and metal, e.g. iron or copper, passivating agent or as antiwear agent and corrosion inhibitor.

Another embodiment of the invention relates to a process for preparing the structurally modified polymeric compound (I), which comprises polymerising by atom transfer radical polymerisation (ATRP) ethylenically unsaturated monomers or oligomers corresponding to the polymer blocks A and B in the presence of a polymerisation initiator of the formula:

$$X—Y'_m \quad (II),$$

wherein

X represents the fragment of a polymerisation initiator capable of initiating polymerisation of ethylenically unsaturated monomers by ATRP;

Y' represents a radically transferable atom or group; and m represents a numeral from one to six;

And in the presence of a catalyst capable of activating controlled radical polymerisation by ATRP and replacing Y in a polymerisate of the formula $$X\text{-}[(A_x\text{-}B_y)\text{—}Y']_m \quad (IV),$$

with a compound of the formula:

$$H—Y\text{-}Z \quad (V)$$

or a reactive functional derivative thereof, e.g. a salt, under removal of H—Y'.

The polymerisation process may be carried out in the presence of water or an organic solvent or mixtures thereof. Additional co-solvents or surfactants, such as glycols or ammonium salts of fatty acids, may be added to the reaction mixture. The amount of solvent should be kept as low as possible. The reaction mixture may contain the above-mentioned monomers or oligomers in an amount of 1.0 to 99.9% by weight, preferably 5.0 to 99.9% by weight, and especially preferably 50.0 to 99.9% by weight, based on the monomers present in the polymerisate.

If organic solvents are used, suitable solvents or mixtures of solvents are typically pure alkanes (hexane, heptane, octane, isooctane), hydrocarbons (benzene, toluene, xylene), alkanols (methanol, ethanol, ethylene glycol, ethylene glycol monomethyl ether), esters (ethyl, n-propyl, n-butyl or n-hexyl acetate) and ethers (diethyl or dibutyl ether, ethylene glycol dimethyl ether, tetrahydrofuran), or mixtures thereof.

If water is used as a solvent the reaction mixture can be supplemented with a water-miscible or hydrophilic co-solvent. The reaction mixture will then remain in a homogeneous single phase throughout the monomer conversion. Any water-soluble or water-miscible co-solvent may be used, as long as the aqueous solvent medium is effective in providing a solvent system, which prevents precipitation or phase separation of the reactants or polymer products until full completion of the polymerisation. Exemplary co-solvents useful in the process may be selected from the group consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organosulphides, sulphoxides, sulphones, alcohol derivatives, hydroxyether derivatives such as butyl carbitol or cellosolve, amino alcohols, ketones, and the like, as well as derivatives and mixtures thereof. Specific examples include methanol, ethanol, propanol, dioxan, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic solvents are selected for the process, the water to co-solvent weight ratio is typically in the range of about 99:1 to about 10:90.

When monomer mixtures or monomer/oligomer mixtures are used, the calculation of mol % is based on an average molecular weight of the mixture.

The polymerisation temperature may range from about 50° C. to about 180° C., preferably from about 80° C. to about 150° C. At temperatures above about 180° C., the controlled conversion of the monomers into polymers may decrease, and undesirable by-products like thermally initiated polymers are formed or decomposition of the components may occur.

A suitable catalyst capable of activating ATRP Is a transition metal complex catalyst salt present as an oxidisable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such as hydride ions ($H^-$) or anions derived from inorganic or organic acids, examples being halides, e.g. $F^-$, $Cl^-$, $Br^-$ or $I^-$, halogen complexes with transition metals, such as $Cu(I)Br_2^-$, halogen complex ions of Lewis bases of the type $BF_4^-$, $PF_6^-$, $SbF_6^-$ or $AsF_6^-$, anions of oxygen acids, alcoholates or acetylides or the anion of cyclopentadiene.

Anions of oxygen acids are, for example, sulphate, phosphate, perchlorate, perbromate, periodate, antimonate, arsenate, nitrate, carbonate, the anion of a $C_1$-$C_8$carboxylic acid, such as formate, acetate, propionate, butyrate, benzoate, phenylacetate, mono-, di- or trichloroacetate- or trifluoroacetate, sulphonates, for example methyl-, ethyl-, n-propyl- or n-butylsulphonate, trifluoromethylsulphonate (triflate), unsubstituted or $C_1$-$C_4$alkyl-, $C_1$-$C_4$alkoxy- or halo-, especially fluoro-, chloro- or bromo-substituted phenylsulphonate or benzylsulphonate, for example tosylate, mesylate, brosylate, p-methoxy- or p-ethoxyphenylsulphonate, pentafluorophenylsulphonate or 2,4,6-triisopropylsulphonate, phosphonates, for example methylphosphonate, ethylphosphonate, propylphosphonate, butylphosphonate, phenylphosphonate, p-methylphenylphosphonate or benzylphosphonate, carboxylates derived from a $C_1$-$C_8$carboxylic acid, for example formate, acetate, propionate, butyrate, benzoate, phenylacetate, mono-, di- or trichloroacetate or mono-, di- or trifluoroacetate, and also $C_1$-$C_{12}$alcoholates, such as straight chain or branched $C_1$-$C_{12}$alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$-$C_4alkyl)_4N^+$.

Suitable neutral ligands are inorganic or organic neutral ligands commonly known in complex chemistry of transition, metals. They coordinate to the metal ion through a σ-, π-, μ- or η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i$-$C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethylenetriamine (PMDETA), $C_1$-$C_8$-glycols or glycerides, e.g. ethylene or propylene glycol or derivatives thereof, e.g. di-, tri- or tetraglyme, and mono- or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bis-pyridine, pi-colylimine, γ-pyran, γ-thiopyran, phenanthroline, pyrimidine, bis-pyrimidine, pyrazine, indole, coumarone, thionaphthene, carbazole, dibeniofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

The oxidisable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

The transition metal in the oxidisable transition metal complex catalyst salt is converted from its lower oxidation state in the above-mentioned redox systems to its higher oxidation state. In a preferred embodiment of the process a Cu(I) complex catalyst salt is converted to the corresponding Cu(II) oxidation state.

Because the present polymerisation by ATRP is a "living" polymerisation, it can be started and terminated practically at will. The copolymers (I) as obtained by the process have a low polydispersity. Preferably the polydispersity is from 1.01 to 2.20, more preferably from 1.01 to 1.90, and most preferably from 1.01 to 1.50.

The various advantages of the process of this type that allow a large range of polymerisation reactions are described by K. Matyjaszewski in *ACS Symp. Ser. Vol.* 685 (1998), pg. 2-30.

The elimination of the transfer group Y', e.g. halogen, with —Y-Z is advantageously performed in such a way that the polymerisate is dissolved in a solvent and the compound corresponding to H—Y-Z (IV) is added in the presence of a non-nucleophilic base such as diazabicycloundecene (DBU) or other bases at higher temperatures. The reaction, which is a conventional nucleophilic substitution reaction, takes place within a temperature range from room temperature to the boiling temperature of the reaction mixture, preferably from room temperature to 100° C.

The invention furthermore relates to compositions comprising
a) A polymeric compound (I) or mixtures thereof, wherein X, A, B, Y, Z, x, y and m are as defined above; and
b) A composition of matter subject to oxidative, thermal or light induced degradation.

The polymeric compounds (I) are particularly suitable for stabilising organic material, especially polymers, specifically styrene (co)polymers, such as polystyrene, ABS (acrylonitrile-butadiene-styrene), IPS (impact polystyrene, graft copolymer of styrene on polybutadiene), MBS (methacrylonitrile-butadiene-styrene) and SBS (styrene-butadiene-styrene). In this context, they act in particular as antioxidants.

This invention furthermore relates to compositions comprising a polymeric compound of formula I or mixtures thereof in combination with a base oil of lubricating viscosity or a fuel.

The invention particularly relates to compositions comprising
a') A polymeric compound (I) or mixtures thereof, wherein X, A, B, Y, Z, x, y and m are as defined above; and
b') A base oil of lubricating viscosity.

These compositions are used, for example in combustion engines, e.g. In motor vehicles equipped e.g. with engines of the Otto, diesel, two-stroke, Wankel or orbital type.

A further embodiment of the invention relates to a process for improving the performance properties of lubricants or lubricating greases, such as motor oil, turbine oil, gear oil, hydraulic or metal working fluids or liquid fuels, e.g. diesel or carburettor fuels, which comprises adding at least one polymeric compound (I) to achieve an antioxidant, metal passivating, antiwear or corrosion inhibiting effect. Accordingly, this invention also relates to the use of the polymeric compounds of formula I as additives in lubricants or lubricating greases, such as motor oils, turbine oils, gear oils, hydraulic fluids, metal working fluids, lubricating greases or diesel or carburettor fuels.

Such lubricating greases or lubricants, metal working, gear and hydraulic fluids are based, for example, on mineral or synthetic oils or on mixtures thereof, such as the ones described in the literature, for example in *Chemistry and Technology of Lubricants*; Mortier, R. M. and Orszulik, S. T. (Editors); 1992 Blackie and Son Ltd. for GB, VCH-Publishers N.Y. for U.S., ISBN 0-216-92921-0, see pages 208 et seq. and 269 et seq.; In *Kirk-Othmer Encyclopedia of Chemical Technology*, fourth Edition 1969, J. Wiley & Sons, New York, Vol. 13, page 533 et seq. (Hydraulic Fluids); *Performance Testing of Hydraulic Fluids*, R. Tourret and E. P. Wright, Hyden & Son Ltd. GB, on behalf of The Institute of Petroleum London, ISBN 0 85501 317 6; *Ullmann's Encyclopedia of Ind. Chem.*, Fifth Completely revised Edition, Verlag Chemie, DE-Weinheim, VCH-Publishers for U.S., Vol A 15, page 423 et seq. (lubricants), Vol. A 13, page 165 et seq. (hydraulic fluids).

The lubricants are preferably oils and greases, based e.g. on a mineral oil.

Another group of lubricants, which may be used, are vegetable or animal oils, fats, tallows and waxes or their mixtures with each other or their mixtures with the mentioned mineral or synthetic oils. Vegetable and animal oils, fats, tallows and waxes are, for example, palmnut oil, palm oil, olive oil, beet oil, rapeseed oil, linseed oil, groundnut oil, soybean oil, cottonseed oil, sunflower oil, pumpkin seed oil, coconut oil, corn oil, castor oil, walnut oil and mixtures thereof, fish oils, tallows of slaughter animals, such as beef tallow, neat's foot oil and bone fat as well as their modified epoxidised and sulphoxidised forms, for example epoxidised soybean oil.

Examples of synthetic lubricants include lubricants based on aliphatic or aromatic carboxylates, polymeric esters, polyalkylene oxides, phosphates, poly-$\alpha$-olefins or silicones, on a diester of divalent acids with a monovalent alcohol, e.g. dioctyl sebacate or dinonyl adipate, on a triester of trimethylolpropane with a monovalent acid or with a mixture of such acids, e.g. trimethylolpropane tripelargonate, trimethylolpropane tricaprylate or mixtures thereof, on a tetraester of pentaerythritol with a monovalent acid or with a mixture of such acids, e.g. pentaerythritol tetracaprylate, or on a complex ester of monovalent and divalent acids with polyvalent alcohols, for example a complex ester of trimethylolpropane with caprylic and sebacic acid or of a mixture thereof. Particularly suitable are, besides mineral oils, e.g. poly-$\alpha$-olefins, ester-based lubricants, phosphates, glycols, polyglycols and polyalkylene glycols and their mixtures with water.

Metal working fluids and hydraulic fluids can be prepared on the basis of the same substances as those described above for the lubricants. They are often also emulsions of such substances with water or other liquids.

The polymeric compounds of the formula I are readily soluble in lubricants, in metalworking and hydraulic fluids and are therefore particularly suitable as additives for lubricants, metal working and hydraulic fluids.

The compositions expediently comprise 0.005 up to 10.0% by weight of the polymeric compounds of the formula I, preferably 0.01-5.0% by weight, more preferably 0.01-0.9% weight.

The polymeric compounds of the formula I can be admixed to the lubricants in a manner known per se. The polymeric compounds are readily soluble for example in oleophilic solvents, e.g. in oils. They can also be used together with additional additives to prepare a concentrate or a so-called additive package, which, depending on the consumption, can be diluted to the concentrations to be used for the corresponding lubricant.

The lubricants, metalworking and hydraulic fluids can additionally contain further additives, which are added to further improve their basic properties. These additives include: additional antioxidants, metal passivators, rust inhibitors, viscosity index improvers, pour point depressants, dispersants, detergents, other extreme pressure additives, antiwear additives and friction reducers. Where appropriate, these additives can act synergistically with each other or with the novel polymeric compounds. Such additives are added in the usual amounts ranging from about 0.01 to 10.0% by weight each. Should it still be necessary to add phosphorus- or metal-containing additives, then these additives are preferably added in small amounts, for example of about 0.01 to 0.5% by weight.

A preferred embodiment of the invention particularly relates to compositions comprising
a") A polymeric compound (I) or mixtures thereof, wherein X, A, B, Y, Z, x and y are as defined above; and
b") A polymer material to be stabilised against oxidative, thermal or light-induced degradation.

In these compositions, the content of the polymeric compounds (I) may amount from about 0.01 to 10% by weight, for example from 0.05 to 5.0% by weight, preferably from 0.05 to 3.0% by weight, but in particular from 0.1 to 2.0% by weight.

The incorporation into the polymer materials can be carried out, for example, by mixing in the polymeric compounds (I) or mixtures and, if desired, further additives in accordance with known methods. The incorporation into the polymeric material may take place prior to or during the shaping operation or by applying the dissolved or dispersed polymeric compounds (I) to the polymer, with or without subsequent evaporation of the solvent. In the case of elastomers, these can also be stabilised as lattices. A further, preferred possibility for use of the polymeric compounds (I) is their addition, during the preparation of rubber mixtures, together with the other, customary mixture constituents and ingredients in accordance with the customary techniques, for example in Banbury mixers, on mixing-roll units or in mixing extruders.

The invention therefore relates in particular to compositions in which polymeric compounds of the formula I are Incorporated into and/or chemically linked with an elastomer/polymer.

The polymeric compounds (I) or mixtures thereof can also be added in the form of a master batch, which contains these compounds in a concentration, for example, of from 2.5 to 25.0% by weight, to the plastics which are to be stabilised.

The polymeric compound of the formula I can expediently be incorporated by the following methods:
- As an emulsion or as a dispersion (e.g. to lattices or emulsion polymers);
- As a dry mix during the mixing in of additional components or polymer mixtures;
- By direct addition to the processing apparatus (e.g. extruder, internal mixer, etc.);
- As a solution or melt.

Novel polymer compositions can be employed in various forms and processed to give various products, for example as or to films, fibres, tapes, moulding compounds or profiles, or as binders for coating materials or adhesives or putties.

Examples of polymer materials to be stabilised are:
1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene, norbornene or dicyclopentadiene; furthermore polyethylene (which optionally can be crosslinked), for example high density polyethylene (HDPE), low density polyethylene (LDPE), linear low density polyethylene (LLDPE), branched low density polyethylene (BLDPE);

Polyolefins, i.e. polymers of monoolefins exemplified in the preceding paragraph, in particular polyethylene and polypropylene, can be prepared by different, and especially by the following, methods:
   a), Radical polymerisation (normally under high pressure and at elevated temperature)
   b) Catalytic polymerisation using a catalyst that normally contains one or more metals of group IVb, Vb, VIb or, VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium (III) chloride, alumina or silicon oxide. These catalysts may be soluble or insoluble in the polymerisation medium. The catalysts can be active as such in the polymerisation or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, di-cyclopentadiene or ethylidene-norbornene; and mixtures of such copolymers with one another and with polymers mentioned under 1), for example polypropylene-ethylene-propylene copolymers, LDPE-ethylene-vinyl acetate copolymers; LDPE-ethylene-acrylic acid copolymers, LLDPE-ethylene-vinyl acetate copolymers, LLDPE-ethylene-acrylic acid copolymers and alternating or random polyalkylene-carbon monoxide co-polymers and mixtures thereof with other polymers, for example polyamides.

4. Hydrocarbon resins (for example $C_5$-$C_9$) including hydrogenated modifications thereof (e.g. tackifier resins) and mixtures of polyalkylenes and starch.

5. Polystyrene, poly(p-methylstyrene), poly(alpha-methylstyrene).

6. Copolymers of styrene or alpha-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene (SBS), styrene-isoprene-styrene, styrene-ethylene-butylene-styrene or styrene-ethylene-propylene-styrene.

7. Graft copolymers of styrene or alpha-methylstyrene, for example styrene on polybutadiene, styrene on polybutadiene-styrene or polybutadiene-acrylonitrile co-polymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.
8. Halogen-containing polymers such as polychloroprene, chlorinated rubber, chlorinated or sulphochlorinated polyethylene, copolymers of ethylene and chlorinated ethylene, epichlorohydrine homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.
9. Polymers derived from alpha, beta-unsaturated acids and derivatives thereof such as polyacrylates and polymethacrylates, polymethyl methacrylates, polyacrylamides and polyacrylonitriles, impact-modified with butyl acrylate.
10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.
11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; as well as their copolymers with olefins mentioned in paragraph 1.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes, which contain comonomers, for example ethylene oxide; polyacetals modified with thermoplastic polyurethanes, acrylates or MBS.
14. Polyphenylene oxides and sulphides, and mixtures thereof with styrene polymers or polyamides.
15. Polyurethanes derived from hydroxyl-terminated polyethers, polyesters and polybutadienes on the one hand and aliphatic or aromatic polyisocyanates on the other, as well as precursors thereof.
16. Polyamides and co polyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or co polyamides modified with EPDM or ABS; and polyamides condensed during processing (RIM polyamide systems).
17. Polyureas, polyimides, polyamide-imides and polybenzimidazoles.
18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.
19. Polycarbonates and polyester carbonates.
20. Polysulphones, polyether sulphones and polyether ketones.
21. Crosslinked polymers derived from aldehydes on the one hand and phenols, urea or melamine on the other hand, such as phenol/formaldehyde resins, urea/formaldehyde resins and melamine/formaldehyde resins.
22. Drying and non-drying alkyd resins.
23. Unsaturated polyester resins derived from co polyesters of saturated and unsaturated dicarboxylic acids with polyhydric alcohols and vinyl compounds as cross linking agents, and also halogen-containing modifications thereof of low flammability.
24. Crosslinkable acrylic resins derived from substituted acrylates, for example from epoxy acrylates, urethane acrylates or polyester acrylates.
25. Alkyd resins, polyester resins and acrylate resins crosslinked with melamine resins, urea resins, polyisocyanates or epoxy resins.
26. Crosslinked epoxy resins derived from polyepoxides, for example from bisglycidyl ethers, or cycloaliphatic diepoxides.
27. Natural polymers such as cellulose, natural rubber, gelatin and derivatives thereof which have been chemically modified in a polymer-homologous manner, for example cellulose, acetates, cellulose propionates and cellulose butyrates, or the cellulose ethers such as methylcellulose; and also rosins and derivatives.
28. Blends (polyblends) of, the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR,
29. POM/acrylate, POM/MBS, PPO/HIPS, PPO/PA and copolymers, PA/HDPE, PA/PP or PA/PPO.
30. Aqueous emulsions of natural or synthetic rubbers, for example natural rubber latex or lattices of carbonated styrene-butadiene copolymers.
31. Natural and synthetic organic substances which are pure monomeric compounds or mixtures thereof, for example mineral oils, animal or vegetable fats, oils and waxes, or oils, waxes and fats based on synthetic esters (e.g. phthalates, adipates, phosphates or trimellitates), and also blends of synthetic esters with mineral oils in any desired proportions by weight, as are employed, for example, as spin finishes, and also the aqueous emulsions thereof.

The invention therefore also relates to compositions comprising the polymer materials to be stabilised against oxidative, thermal and/or light-induced degradation, at least one polymeric compound (I) and additives customarily present in polymer compositions.

Such additives can be added in small amounts, e.g. UV absorbers or light stabilisers, for example from the series of hydroxyphenylbenzotriazoles, hydroxyphenylbenzophenones, oxalamides and hydroxyphenyl-s-triazines. Especially suitable are light stabilisers from the group of so-called sterically hindered amines (HALS), e.g. of the 2-(2-hydroxyphenyl)-1,3,5-triazine or 2-hydroxyphenyl-2H-benzotriazole type. Examples of light stabilisers of the 2-(2-hydroxyphenyl)-1,3,5-triazine type are known from the patent literature, e.g. U.S. Pat. No. 4,619,956, EP-A-434 608, U.S. Pat. Nos. 5,198,498, 5,322,868, 5,369,140, 5,298,067, WO-94/18278, EP-A-704 437, GB-A-2 297 091 or WO-96/28431.

The compositions may comprise additional additives, for example fillers, e.g. calcium carbonate, silicates, glass or glass fibre material, talcum, kaolin, mica, barium sulphate, metal oxides and hydroxides, carbon black, graphite, powdered wood and powdered or fibrous material of other natural products, synthetic fibres, plasticisers, lubricants, emulsifiers, pigments, flow auxiliaries, catalysts, optical brighteners, flame-retardants, antistatics and blowing agents.

The compositions may contain the above-mentioned customary additives and the polymer or oligomer components in concentrations of about from 0.01 to 99.0% by weight, preferably from 0.1 to 95% by weight, especially from 1.0 to 90.0% by weight, more especially from 5.0 to 80.0% by weight, based on the monomer content of the composition.

The invention therefore also relates to compositions comprising polymer materials to be stabilised against oxidative, thermal and/or light-induced degradation, and at least one polymeric compound (I).

The following. Examples illustrate the invention (h: hour(s)):

EXAMPLE 1

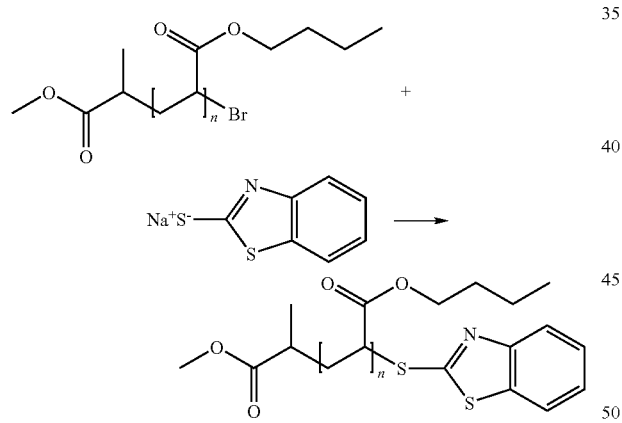

0.7 g (4 mmol) of 2-mercaptobenzothiazole and ca. 0.1 g of tetrabutylammonium bromide (TBAB) are added to a solution of 3.7 g (ca. 3.9 mmol) of the bromine terminated ATRP polymer poly-n-butyl acrylate*) in 10 ml toluene. After the addition of 2 ml of 2M NaOH the reaction mixture is stirred at 70° C. for 1 h. The solvents are distilled off and 50 ml of toluene is added and distilled off again. After heating for another 4 h at 70° C. the raw product is dissolved in 50 ml hexane, washed with 1M NaOH and water, acidified with 1M HCl, washed with more water (−>pH 5-6), filtered, concentrated at reduced pressure (0.05 mbar) and dried at 100° C. 3.7 g of a clear, yellow oil are obtained; $n^D_{20}$ 1.4911; elemental analysis: 62.90% C, 8.69% H, 1.06% N, 5.00% S, residual Br <30 ppm Br.)

The low molecular weight poly-n-butylacrylate is prepared by ATRP according to the method described in WO 00/18807 (e.g. Example 2b) with the following specific data: $M_n$: 960; PDI 1.20; $n^D_{20}$: ~6.2.

EXAMPLE 2

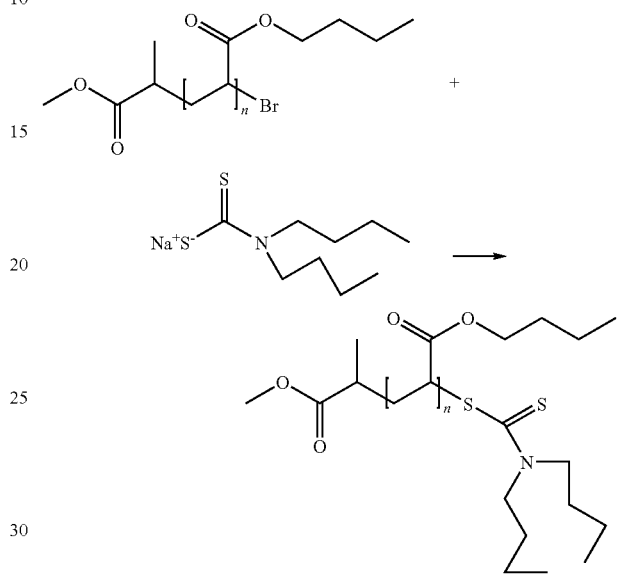

A solution of 1.2 g (5 mmol) of sodium di-n-butyl-dithiocarbamate in 10 ml toluene is added to 3.7 g (ca. 3.9 mmol) of the bromine terminated ATRP polymer poly-n-butyl acrylate (WO 00/18807, Example 2b) used in Example 1. After stirring for 1 h at 65° C. and 3 h at 70° C. under reduced pressure the solvents are removed and the raw product is dissolved with 30 ml hexane, washed with water, acidified with 1M HCl and washed with more water (−>pH 5-6). The organic solution is filtered, concentrated under reduced pressure (ca. 0.05 mbar) and dried at 100° C. 3.9 g of a clear, yellow oil (95% of th.) are obtained; $n^D_{20}$: 1.4787; elemental analysis: 63.08% C, 9.58% H, 1.06% N, 4.92% S, residual Br <30 ppm.

EXAMPLE 3

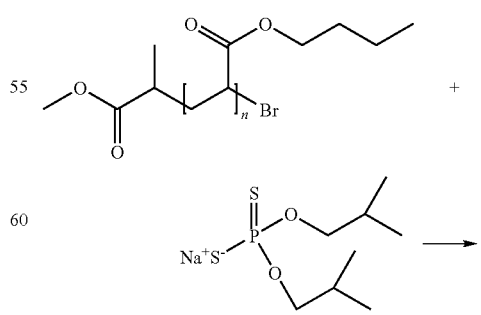

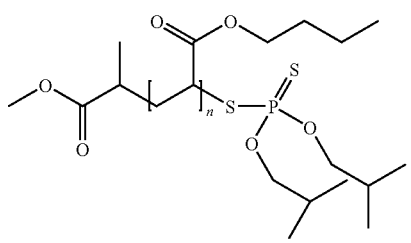

1.0 g (4 mmol) distilled diisobutyldithiophosphoric acid and ca. 0.1 g TBAB are added to a solution of 3.7 g (ca. 3.9 mmol) of the bromine terminated ATRP polymer poly-n-butyl acrylate (WO 00/18807, Example 2b) in 10 ml toluene used in Example 1. 2 ml 2N NaOH is added and the emulsion is stirred for 60° C. at 2 h. The solvents are distilled off under reduced pressure. The residue is stirred for another 4 h at 70° C., dissolved n hexane, washed with water, acidified with 1M HCl, washed neutral with some more water, filtered, concentrated under reduced pressure (0.05 mbar) and dried at 100° C. 4.2 g of a clear, yellowish oil (95% of th.) are obtained; $n^D_{20}$: 1.4708; elemental analysis: 60.30% C, 9.58% H, 2.16% P, 4.51% S, residual Br <360 ppm.

EXAMPLE 4

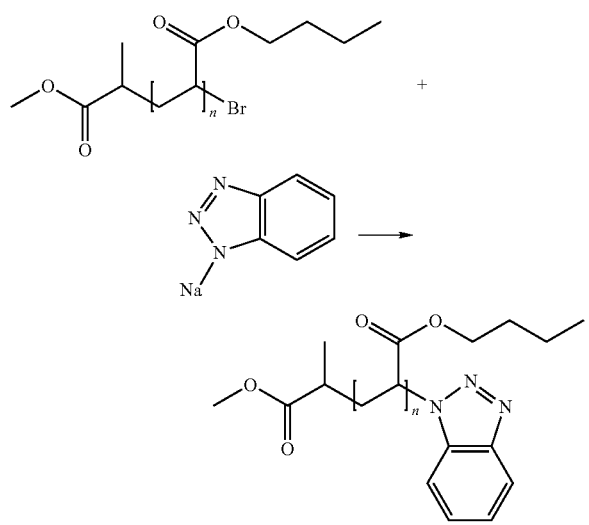

0.9 g (7.5 mmol) benzotriazole and 0.1 g TBAB are added to a solution of 6.9 g (ca. 5.0 mmol) of the bromine terminated ATRP polymer poly-n-butyl acrylate*) in 20 ml of toluene. After the addition of 3.8 ml of 2M NaOH the reaction mixture is stirred at 70° C. for 2 h. The solvents are distilled off under reduced pressure. After adding a 50 ml additional toluene the solvents are distilled off again. After heating for another 3 h at 70° C. the raw product is dissolved in 50 ml hexane, washed with water, filtered, concentrated at reduced pressure (ca. 0.05 mbar) and dried at 100° C. 5.5 g of clear, yellow oil are obtained; $n^D_{20}$: 1.4759; elemental analysis: 64.69% C, 8.99% H, 2.71% N, with only 70 ppm Br left.

*) The low molecular weight poly-n-butylacrylate is prepared by ATRP according to the method as described in WO 00/18807 (e.g. Example 2b) with the following specific data: Mn: 1380, $n^D_{20}$: ~9.5.

EXAMPLE 5

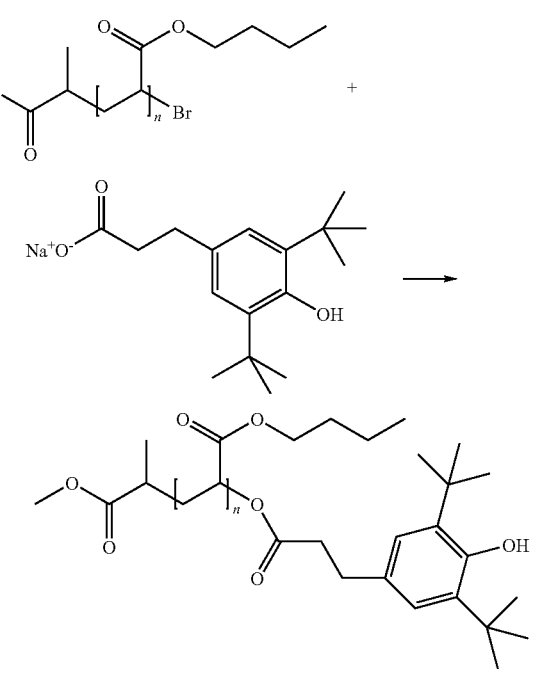

2.1 g (7.5 mmol) of sodium 3-(2,6-di-tert-butyl-1-hydroxyphenyl)-propionate and 0.1 g TBAB are added to a solution of 6.9 g (ca. 5.0 mmol) of the bromine terminated ATRP polymer poly-n-butyl acrylate (WO 00/18807, Example 2b) in 20 ml of toluene used in Example 4. After the addition of 5.1 ml of 2M NaOH the reaction mixture is stirred at 70° C. for 1 h. The solvents are distilled off under reduced pressure. After adding another 50 ml toluene and distilling off the solvent a third amount of 50 ml of toluene and 10 ml of dry dimethylformamide are added and distilled off under reduced pressure at ca. 80° C. within 3.5 h. The raw product is dissolved in 50 ml hexane, washed with water, 1N NaOH, 1N HCl and brine, filtered, concentrated at reduced pressure (ca. 0.05 mbar) and dried at 100° C. 5.2 g of a clear, yellow oil are obtained; $n^D_{20}$ 1.4737; elemental analysis: 66.28% C, 9.36% H, residual Br <41 ppm.

EXAMPLE 6

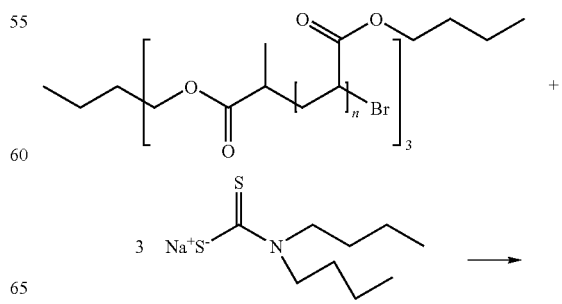

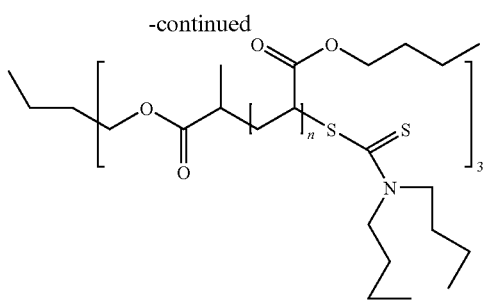

A solution of 3.3 g (13.5 mmol) of sodium di-n-butyl-dithiocarbamate in 40 ml toluene is added to 7.1 g (ca. 3.0 mmol) of the tris-bromine terminated branched poly-n-butyl acrylate ATRP polymer*). After stirring for 1 h at 70° C. and 2 h at 70° C. under reduced pressure and distilling off the solvents, the raw product is dissolved with 100 ml toluene, washed with water, acidified with 1M HCl and washed with more water (–>pH 5-6). The organic solution is filtered, concentrated under reduced pressure (ca. 0.05 mbar) and dried at 100° C. 7.3 g of a clear, yellow oil (90% of th.) are obtained. $N^D{}_{20}$: 1.4913; elemental analysis: 61.74% C, 9.17% H, 1.49% N, 6.73% S, residual Br <940 ppm Br.

*) The low molecular weight tris-bromine terminated poly-n-butylacrylate is prepared by ATRP according to the method as described in WO 20/0043344 (e.g. Example 5a) with the following specific data: $M_n$ 2380, n~4.9

EXAMPLE 7

Antiwear test: To test the suitability as antiwear additive, the standard method ASTM D-2783-81 is applied using a Shell four-ball tester. The base oil used is a VG 46 mineral oil to which the test compound according to the Examples of above is added in the amount indicated in the Table.

The average wear scar diameter WSD (in mm) is determined at a 40 kg load at 1440 rpm after 1 hour of operation. The results obtained are compiled in the Table

TABLE

| Compound of Example | Additive amount [% By weight] | WSD [mm] |
|---|---|---|
| Base oil |  | 0.82 |
| 1 | 1.0 | 0.47 |
| 2 | 1.0 | 0.48 |
| 3 | 1.0 | 0.52 |

The invention claimed is:

1. A polymeric compound of the formula $$X-[(A_x-B_y)-Y-Z]_m \quad (I),$$

wherein

X represents the fragment of a polymerisation initiator which initiates polymerisation of ethylenically unsaturated monomers by atom transfer radical polymerisation (ATRP) in the presence of a catalyst which activates controlled radical polymerisation by ATRP;

A and B represent polymer blocks composed of repeating units of ethylenically unsaturated monomers;

One of x and y independently of one another represents zero, one or a numeral greater than one and the other one represents one or a numeral greater than one, provided that the sum of x and y is at least two;

Y represents the direct bond or a bivalent group;

Z represents a polymer chain terminal group structurally modified with a functionally effective group of a lubricant or polymer additive, wherein Z is derived from an antioxidant molecule selected from the group consisting of alkylated monophenols, alkylthiomethyl phenols, alkylidene bisphenols, esters of β-(5-tert-butyl-4-hydroxy-3-methylphenyl)-propionic acid, β-(3,5-di-tert-butyl-4-hydroxyphenyl)propionic acid, β-(3,5-dicyclohexyl-4-hydroxyphenyl) propionic acid or 3,5-di-tert-butyl-4-hydroxyphenylacetic acid, diphenylamines, benzofuranones, phosphites, phosphonites and thiosynergists, or a metal deactivator molecule selected from the group consisting of benzotriazoles, triazoles, benzimidazoles, imidazoles, benzothiazoles and thiadiazoles and derivatives thereof, or an antioxidant, extreme pressure or antiwear (EP/AW) molecule selected from the group consisting of phosphates, thiophosphates, thiophosphites, dithiophosphates, phosphonates, thiophosphonates, dithiocarbamates and esters of thiodipropionic or thiodiacetic acid and m represents a numeral from one to six.

2. The polymeric compound according to claim 1, wherein X represents the fragment of a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, haloalkanenitriles, α-haloacrylates and halolactones; and m represents one.

3. The polymeric compound according to claim 1, wherein the polymer blocks A and B comprise repeating units selected from the group consisting of styrenes, acrylic and $C_1$-$C_4$alkylacrylic acid-$C_1$-$C_{24}$alkyl esters, acrylic and $C_1$-$C_4$alkylacrylic acid-$C_6$-$C_{11}$aryl-$C_1$-$C_4$alkyl esters, acrylic and $C_1$-$C_4$alkylacrylic acid-$C_6$-$C_{11}$aryloxy-$C_1$-$C_4$alkyl esters, acrylic and $C_1$-$C_4$alkylacrylic acid-hydroxy-$C_2$-$C_6$alky esters, acrylic and $C_1$-$C_4$alkylacrylic acid-polyhydroxy-$C_3$-$C_6$alkyl esters, acrylic and $C_1$-$C_4$alkylacrylic acid-$(C_1$-$C_4$alkyl$)_3$silyloxy-$C_2$-$C_4$alkyl esters, acrylic and $C_1$-$C_4$alkylacrylic acid-$(C_1$-$C_4$alkyl$)_3$silyl-$C_1$-$C_4$alkyl esters, acrylic and $C_1$-$C_4$alkylacrylic acid-heterocyclyl-$C_2$-$C_4$alkyl esters, acrylic and $C_1$-$C_4$alkylacrylic acid esters having poly-$C_2$-$C_4$alkyleneglycol ester groups, wherein the ester groups may be substituted with $C_1$-$C_{24}$alkoxy groups, acrylic and methacrylic acid amides, acrylic and $C_1$-$C_4$alkylacrylic acid-$(C_1$-$C_4$alkyl$)_{1-2}$amide, acrylonitrile, esters of maleic acid or fumaric acid, maleinimide and N-substituted maleinimides.

4. The polymeric compound according to claim 1, wherein the polymer blocks A and B comprise repeating units selected from the group consisting of styrenes, acrylic and methacrylic acid-$C_1$-$C_{24}$alkyl esters, acrylic and methacrylic acid-hydroxy-$C_2$-$C_6$alkyl esters, acrylic and methacrylic acid-dihydroxy-$C_3$-$C_4$alkyl esters and acrylic and methacrylic acid esters having poly-$C_2$-$C_4$alkyleneglycol ester groups, wherein the ester groups may be substituted with $C_1$-$C_{24}$alkoxy groups.

5. The polymeric compound according to claim 1, wherein the polymer blocks A and B or A and B contain repeating units of ethylenically unsaturated monomers substituted with basic groups.

6. The polymeric compound according to claim 5, wherein ethylenically unsaturated monomers substituted with basic groups are represented by amino monomers selected from the group consisting of 4-aminostyrene, 4-dimethylaminostyrene and an aminoalkyl (meth)acrylate selected from the group consisting of 2-dimethylaminoethyl acrylate (DMAEA), 2-dimethylaminoethyl methacrylate (DMAEMA), 2-diethylaminoethyl acrylate (DEAEA), 2-diethylaminoethyl methacrylate (DEAEMA), 2-tert-butylaminoethyl acrylate (t-BAEA), 2-tert-butylaminoethyl methacrylate (t-BAEMA) and 3-dimethylaminopropylmethacrylamide, 4-vinylpyridine, 2-vinylpyridine and 1-vinylimidazole.

7. The polymeric compound (I) according to claim 1, wherein

X represents the fragment of a polymerisation initiator which is selected from the group consisting of $C_1$-$C_8$alkyl halides, $C_6$-$C_{15}$aralkyl halides, $C_2$-$C_8$haloalkyl esters, arene sulphonyl halides, haloalkanenitriles, α-haloacrylates and halolactones;

A and B represent polymer blocks composed of repeating units of acrylic acid or methacrylic acid esters selected from the group consisting of styrenes, acrylic and $C_1$-$C_4$alkylacrylic acid-$C_1$-$C_{24}$alkyl esters, acrylic and $C_1$-$C_4$alkylacrylic acid-$C_6$-$C_{11}$aryl-$C_1$-$C_4$alkyl esters, acrylic and $C_1$-$C_4$alkylacrylic acid-$C_6$-$C_{11}$aryloxy-$C_1$-$C_4$alkyl esters, acrylic and $C_1$-$C_4$alkylacrylic acid-hydroxy-$C_2$-$C_6$alkyl esters, acrylic and $C_1$-$C_4$alkylacrylic acid-polyhydroxy-$C_3$-$C_6$alkyl esters, acrylic and $C_1$-$C_4$alkylacrylic acid-($C_1$-$C_4$alkyl)$_3$silyloxy-$C_2$-$C_4$alkyl esters, acrylic and $C_1$-$C_4$alkylacrylic acid-($C_1$-$C_4$alkyl)$_3$silyl-$C_1$-$C_4$alkyl esters, acrylic and $C_1$-$C_4$alkylacrylic acid-heterocyclyl-$C_2$-$C_4$alkyl esters, acrylic and $C_1$-$C_4$alkylacrylic acid esters having poly-$C_2$-$C_4$alkyleneglycol ester groups, wherein the ester groups may be substituted with $C_1$-$C_{24}$alkoxy groups, acrylic and methacrylic acid amides, acrylic and $C_1$-$C_4$alkylacrylic acid-($C_1$-$C_4$alkyl)$_{1-2}$amide, acrylonitrile, esters of maleic acid or fumaric acid, maleinimide and N-substituted maleinimides;

x and y represent numerals greater than zero and define the number of monomer units in the polymer blocks A and B;

Y represents a bivalent bridge group; and

Z represents a polymer chain terminal group structurally modified with the functionally effective group of a lubricant or polymer additive selected from the group consisting of antioxidants, metal deactivators, antiwear and extreme pressure additives and corrosion inhibitors as defined in claim 1.

8. A composition comprising
a) A polymeric compound (I), wherein X, A, B, Y, Z, x, y and m are as defined in claim 1; and
b) A composition of matter subject to oxidative, thermal or light induced degradation.

9. A composition comprising
a') a polymeric compound (I), wherein X, A, B, Y, Z, x, y and m are as defined in claim 1; and
b') a base oil of lubricating viscosity.

* * * * *

UNITED STATES PATENT AND TRADEMARK OFFICE
CERTIFICATE OF CORRECTION

PATENT NO. : 7,615,522 B2
APPLICATION NO. : 10/513837
DATED : November 10, 2009
INVENTOR(S) : Camenzind et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Nineteenth Day of October, 2010

David J. Kappos
*Director of the United States Patent and Trademark Office*